No. 778,624. PATENTED DEC. 27, 1904.
F. A. BAGLEY.
CHICKEN WATERER.
APPLICATION FILED FEB. 29, 1904.

Witnesses
Robt Dollinger
F. J. Kubicek

Inventor
Fred A. Bagley.
By J. M. St. John
Atty

No. 778,624. Patented December 27, 1904.

UNITED STATES PATENT OFFICE.

FRED A. BAGLEY, OF CLARENCE, IOWA.

CHICKEN-WATERER.

SPECIFICATION forming part of Letters Patent No. 778,624, dated December 27, 1904.

Application filed February 29, 1904. Serial No. 195,939.

*To all whom it may concern:*

Be it known that I, FRED A. BAGLEY, a citizen of the United States, residing at Clarence, in the county of Cedar and State of Iowa, have invented certain new and useful Improvements in Chicken-Waterers, of which the following is a specification.

The object of this invention is to provide a simple water receptacle or fountain to supply chickens with drinking-water, and so constructed as to maintain a small quantity of water at a uniform level and so protected as to prevent the chickens from fouling it.

Figure 1:
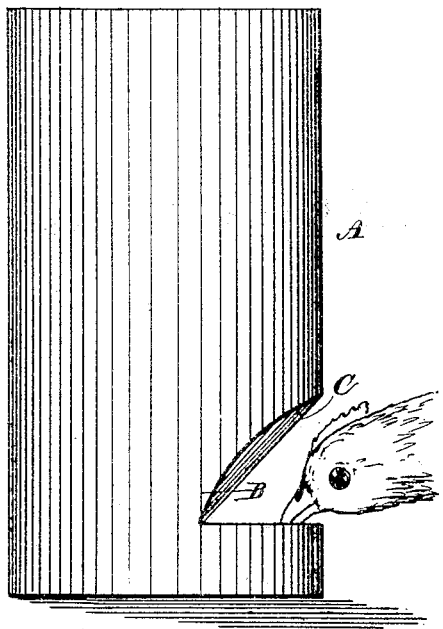
Figure 2:
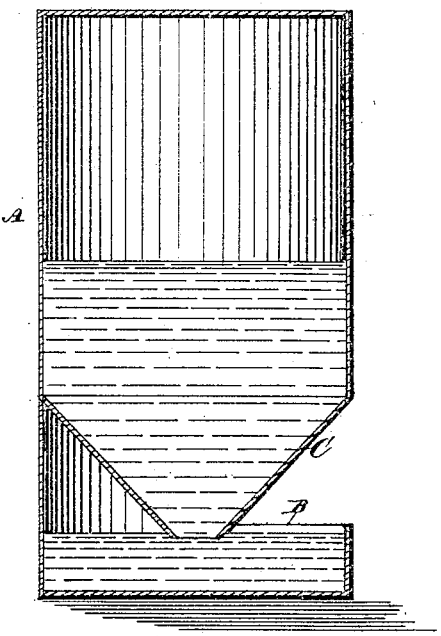
Figure 3:
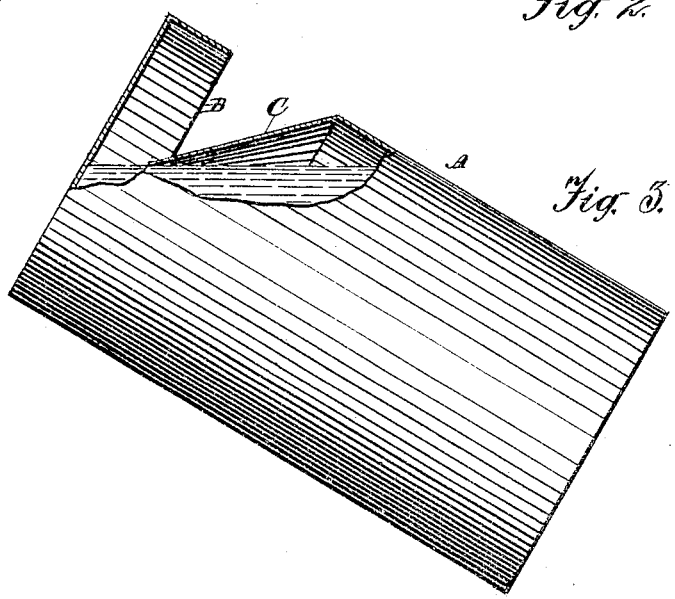

In the accompanying drawings, forming a part of this specification, Figure 1 is a side view of the watering device as in use. Fig. 2 is a central section of the same. Fig. 3 is a view of the same in position for filling, a part being broken away to show the water-level.

The device, which is very simple, is described as follows: A is a cylindrical vessel, preferably made of galvanized sheet metal and closed at both ends. In one side and near one end is a notch B, forming an opening large enough to admit the bill of a chicken, the bottom of the notch being parallel with the end of the vessel on which it stands. Inside the vessel, with its top slightly above the notch, is a funnel C, hermetically secured to the sides of the vessel and with its small outlet extending a little below the level of the bottom of the notch. When in position for use, as in Figs. 1 and 2, the water by atmospheric pressure takes the position shown in Fig. 2, that in the shallow cup at the bottom being uniformly at the level of the funnel-outlet or very slightly higher. A small supply of water is thus provided for the fowls, kept automatically at the uniform level, and protected from dirt and filth.

It is of course impossible to keep the water perfectly clean indefinitely, as the chickens will leave some dirt by dipping their beaks in it, and dust will be blown in to some extent. It is necessary, therefore, to occasionally clean out the cup at the bottom. The construction is such as to make this very convenient, it being possible to reach entirely around the funnel-shaped diaphragm, and so clean all parts of the water-cup at the bottom. This may be done with the water in the cup, which may then be emptied out without emptying or fouling the water in the upper part of the vessel.

Having thus described my invention, what I claim as new, and desire to secure by Letters Patent, is—

The described drinking-fountain for chickens, the same comprising a single and inseparable cylindrical vessel, closed at the top and bottom, having an opening at one side near the bottom, to admit the fowl's beak, and a funnel-shaped diaphragm hermetically attached to the cylinder above said opening, with its apex extending a little below the lower line thereof, the lower end of the vessel forming a shallow drinking-cup, substantially as described.

In testimony whereof I affix my signature in presence of two witnesses.

FRED A. BAGLEY.

Witnesses:
J. M. ST. JOHN,
F. J. KUBICEK.